(No Model.)
D. J. BISSELL.
CULTIVATOR ATTACHMENT.
No. 363,981. Patented May 31, 1887.
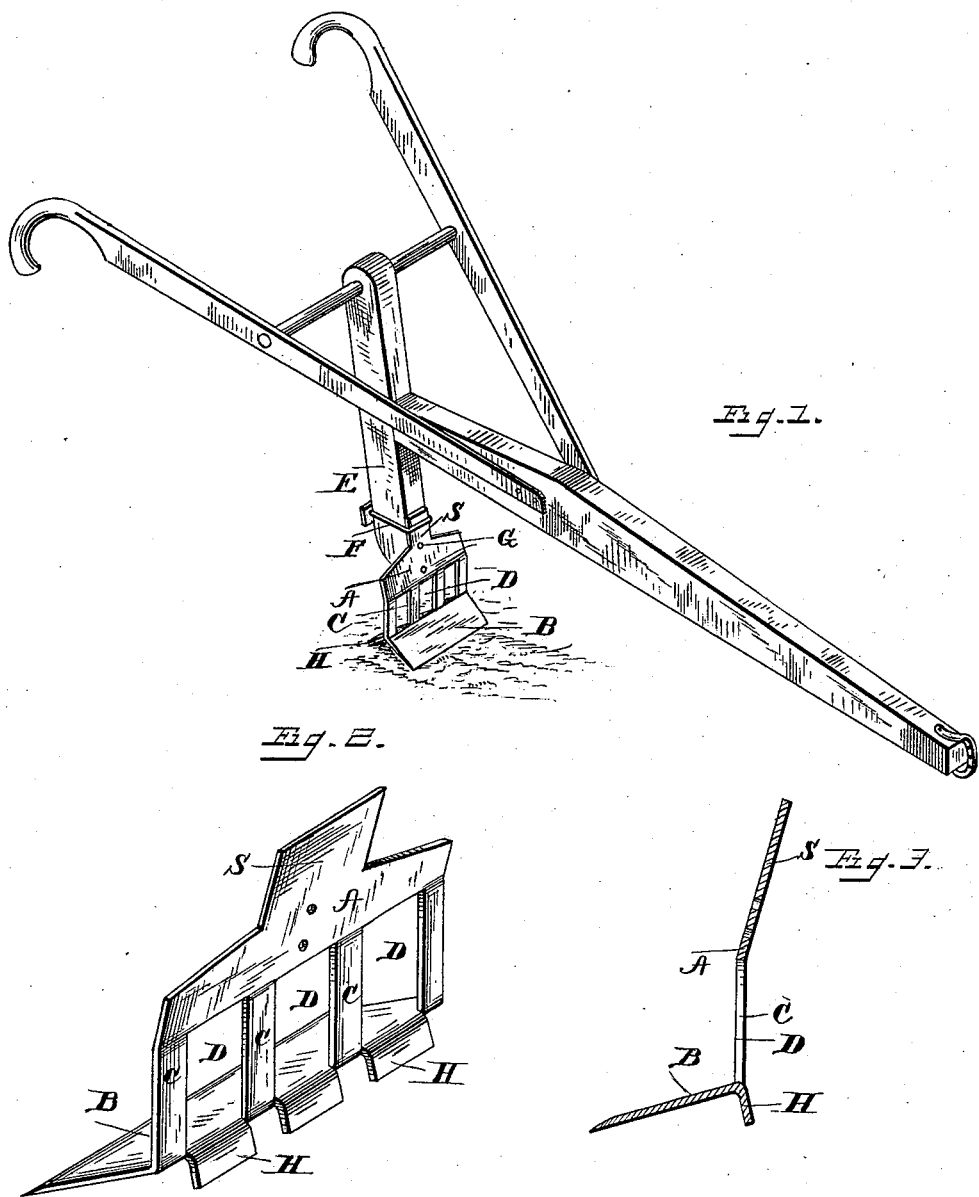

UNITED STATES PATENT OFFICE.

DANIEL J. BISSELL, OF ANAMOSA, IOWA.

CULTIVATOR ATTACHMENT.

SPECIFICATION forming part of Letters Patent No. 363,981, dated May 31, 1887

Application filed March 9, 1887. Serial No. 230,271. (No model.)

*To all whom it may concern:*

Be it known that I, DANIEL J. BISSELL, a citizen of the United States, and a resident of Anamosa, in the county of Jones and State of Iowa, have invented certain new and useful Improvements in Plow and Cultivator Attachments; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of my invention, and is a perspective view of the same. Fig. 2 is a perspective view of the plate A. Fig. 3 is a vertical section of the plate A.

My invention relates to plow and cultivator attachments; and it consists in the construction and novel combination of parts, as hereinafter described and claimed.

The object of the invention is to provide an attachment that may be secured to a plow or cultivator to cut the weeds and to loosen and pulverize the soil between the rows of corn, cotton, sugar-cane, or sorghum, or other crop that has to be cultivated by animal power.

Referring by letter to the accompanying drawings, A designates an attaching-plate, of iron or steel, the shank or stem S of which is secured to the lower end of the plow-standard or cultivator-standard E by bolts G G and a clamp, F, the latter embracing the standard and being secured in place by nuts.

B is the cutting blade or shovel, which is connected to the lower edge of the plate A by connecting-bars C C C, spaces D D D being left between the connecting-bars C C for the loosened soil to pass through, whereby it is crushed, broken, or pulverized very fine and separated from the weeds. The connecting-bars C C stand vertical and the blade B stands nearly horizontal, it being given a slight pitch downward from its rear edge forward Short rectangular blades or fingers H H project or depend at right angles from the rear edge of the blade B, and are about one and a half inch long and serve to stir and mellow the soil below the blade B. The blade B is a thin plate of cast-steel made very sharp, and is designed to run from one inch to one and a half inch deep in the ground, and to run nearly horizontal. The clods and loosened soil pass back through the spaces D D and are broken and finely pulverized in passing through. I have found this attachment simply invaluable during a dry season, as it loosens the soil below the surface and prevents the ground from crusting or baking, and causes it to retain sufficient moisture in the driest season to properly nourish the plants.

The moisture is drawn from the depth below the pulverized surface by capillary attraction, so that, in addition to destroying the weeds and loosening the soil, the latter moistens itself by capillary attraction from below.

Having described my invention, what I claim, and desire to secure by Letters Patent, is—

The combination, with the attaching-plate, of the cutting-blade connected thereto by connecting-bars having spaces D D between them, and the pulverizing-fingers depending at right angles from the rear edge of the cutting-blade, substantially as specified.

In testimony whereof I affix my signature in presence of two witnesses.

DANIEL J. BISSELL.

Witnesses:
J. S. STACY,
F. T. FROST.